Aug. 4, 1964  H. FUEHRING  3,143,497
PROCESS AND APPARATUS FOR RECOVERING RESIDUAL
SOLVENT FROM SLUDGE
Filed Feb. 25, 1960
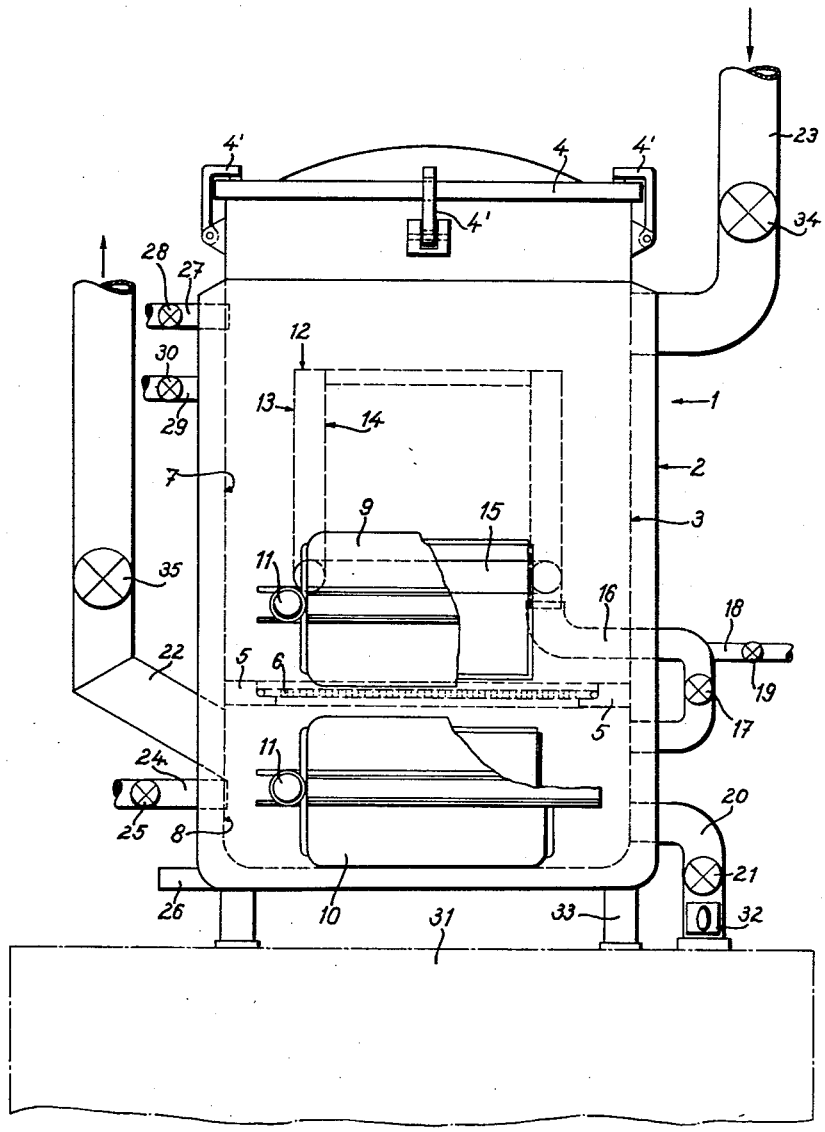
INVENTOR.
*HEINRICH FUEHRING*
BY
*Mestern & Kollin,*
ATTORNEYS United States Patent Office 3,143,497
Patented Aug. 4, 1964

3,143,497
PROCESS AND APPARATUS FOR RECOVERING RESIDUAL SOLVENT FROM SLUDGE
Heinrich Fuehring, Augsburg, Germany, assignor to Max Boehler & Ferdinand Weber, trading as the firm Boehler & Weber Kommanditgesellschaft, Augsburg, Germany
Filed Feb. 25, 1960, Ser. No. 11,020
Claims priority, application Germany Feb. 28, 1959
6 Claims. (Cl. 210—67)

The invention concerns a process and an apparatus for the complete recovery of the solvent residues contained in the sludge of a sludge filter tank, by using a tank having a disc-shaped base filter element and a steam connection for compressing the sludge against the filter element.

Cleaning installations are known in which textiles are cleaned by means of solvents. In such cases it is normal to filter out the dirt, dissolved out of the clothes by the solvent, through a settling filter. For the settling process inert filter adjuvants such as kieselguhr or diatomaceous earth are mostly used which settle with the dissolved dirt on the filter elements and, upon the termination of filtration, are removed to a sludge boiler or filter. Since a certain quantity of solvent is also carried to the sludge filter when draining is effected, it is necessary to recover the excess solvent with the admixed soap and to feed it back to the working liquor. Despite this separation of the solvents, the sludge in the tank also binds other major solvent components which can no longer be used for the cleaning of textiles and thus represent losses. There is therefore a great need to remove these residues of solvent from the sludge.

It has already been proposed for this purpose to provide the sludge-filter tank with compressed-air and drainage pipe lines and to compress the sludge by means of compressed air, so that the solvent is thoroughly squeezed out of the sludge. Such sludge-filter tanks have a disc-shaped base filter which is located approximately in the center of the tank and on which the sludge is deposited. When the compressed air is introduced into the tank, the squeezed-out solvent then flows through this base filter to the bottom and can be conveyed further to the solvent container. In these embodiments the compressed-air pipe line is located above this disc filter so that the compressed air can squeeze the sludge cake against the base filter. It has also been proposed to provide openings in the sludge-filter tank through which the base filter can be removed from the side of the tank so that the squeezed out sludge can be removed from the tank without opening the cover thereof.

Experience has shown that the squeezed out sludge still contains considerable solvent residues. The known cleaning devices must therefore operate with a loss of solvent which has hitherto been inevitable. Since such organic solvents are expensive raw materials, the cleaning process is somewhat uneconomical.

The object of the present invention is to recover all the solvent residues from the sludge by means of steam, either without the use of compressed air, or in conjunction with compressed air, in order to increase still further the profit yield of the cleaning installations.

According to the present invention a process for the complete recovery of solvent residues contained in the sludge of a filter tank, having a disc-shaped base filter element and a compressed-air or steam connection for compressing the sludge against the base filter element, involves a preliminary compression of the sludge by means of steam and/or compressed air, after which steam is again introduced and finely distributed into the tank through a special inlet connection and through a double-walled (flat-sided or cylindrical) additional filter arranged above the base filter element with the action of a steam spray, whereby an intensive precipitation or steaming out of the residual solvents also occurs in the direction of a lower chamber of the tank, a re-distillation preferably being effected in the lower chamber, whereupon the steam, enriched with solvents, is removed through a vertical pipe leading from the tank.

Also according to the present invention, an apparatus for use in the complete recovery of solvent residues contained in the sludge of a filter tank is so constructed that an upper chamber of the tank, which is divided by the disc-shaped base filter element into two chambers, is provided with the aforementioned additional filter whose vertical hollow plates or concentric cylindrical walls define a cavity which is connected to a lower chamber, disposed below the disc-shaped base filter element, and to a steam supply pipe.

A rising pipe line leading to a condenser may be connected to the lower chamber. A special steam supply pipe may be connected to a pipe line communicating with the additional filter and the lower chamber. The connecting pipe line and the steam conduit may each be adapted to be closed by regulating members.

The tank may also be constructed with double walls and heated by means of steam, hot water or electric heating units. At least the disc-shaped base filter element may be removable by sliding it through a closable opening in the side of the tank casing. The closable opening may be provided in the wall of the tank in the region of both chambers.

The invention will be described further, by way of example, with reference to the accompanying drawing, in which the single figure is a schematic representation of one embodiment of the invention.

Sludge falling or removed from the filter of a cleaning plant flows through a pipe line 23 into a sludge-filter tank 1 which is closed by a cover 4 by means of rapid-action fasteners 4'; the pipe line 23 is closable by means of a valve 34. Located inside the tank 1 is a guide 5 adapted to receive a cage-like or disc-shaped base filter element 6; the tank 1 is divided into chambers 7 and 8 by this base filter element 6. For clarity, a door 9 is shown broken away in order to provide a partial view of the inside of the chamber 7. An upstanding filter 12 of annular cross-section, having concentric cylindrical walls 13 and 14, is disposed in the upper chamber 7. The walls 13, 14 of the cylindrical filter 12 are perforated so that the liquid contained in the sludge, which accumulates around the filter 12, can flow through the walls 13 and 14, and then into an intermediate connecting pipe 16 which connects the filter 12 to the lower chamber 8. A closure member 17, such as a valve, is disposed in this intermediate pipe line 16.

When there is sufficient sludge in the tank 1, it is first compressed by means of steam and/or compressed air so that a part of the solvent residue in the sludge can flow both through the connecting pipe 16 and through the base filter 6 into the lower chamber 8. The closure member 17 can also be closed so that the solvent flows into the lower chamber 8 only through the base filter 6. For this purpose steam is conveyed through a pipe 27 into the upper chamber 7. The steam can leave the tank 1 again through a rising pipe 22.

It is possible to introduce steam through a pipe 24, which may be closed by means of a closure member 25, into the tank 1 in order to achieve breaking up of the cake if desired. The solvent residues accumulating in liquid form in the lower chamber 8 during the filtering and squeezing process flow through an outlet pipe 20 into a container 31, it being possible to check the clarity of the drained fluid through the viewing window 32. This pipe line 20 may be closed by a closure member 21. The volatile solvent residues are removed with the steam through the rising pipe 22 leading to the condenser of the cleaning apparatus.

For the complete recovery of the solvent residues in the sludge cake, steam is first introduced between walls 2 and 3 of the tank 1, constituting a heating jacket through a pipe 29 which is closed by means of a closure member 30, whereby the tank 1 is uniformly heated. Regulating members 28, 30, 21 and 17 are closed and steam is introduced into the pipe line 16 through a steam supply pipe 18 by opening a regulating member 19 disposed therein, thus upwardly and in a direction opposite that of the initial solvent flow under pressure of the fluid previously admitted via pipe 27, the steam flowing into the filter 12 through an annular pipe 15. The steam then leaves the filter 12, finely distributed, through its apertured walls 13, 14. The steam flows through the cake from top to bottom on its way to the chamber 8 via filter layer 6, and evaporates the solvent residues in all the pores and cavites inside the sludge cake resting on the receiving surface formed by this layer so as to convey them through the lower chamber 8 and the rising pipe 22 to the condenser (not shown). The capillaries which empty during the steaming out are filled by the condensed steam.

If steam is periodically led directly into the chamber 8 through the pipe line 24 to break up the cake, the rising pipe 22 is closed by a closure member 35 during such time.

It is desirable to provide, in the region of both chambers 7 and 8, doors 9 and 10, respectively, which may be closed by means of the rapid-acting fasteners 11. The doors 9, 10 may be constructed wide enough to enable removal of the base filter 6 through the side of the tank 1. Furthermore it is assumed that the tank 1 stands on the container 31 by means of feet 33. The condensed steam in the cavity between the walls 2 and 3 can be removed through a pipe line 26.

I claim:

1. A process for recovering residual solvent from sludge accumulated on a filter mass during a filtration stage in which the filtered solvent passes through an outlet into a collector, comprising the steps of compacting said sludge under fluid pressure against said filter mass, thereby squeezing and initial flow of solvent from said sludge, directing the squeezed-out solvent through said outlet into the collector, subsequently disconnecting said outlet and collector and passing steam by way of said outlet and said mass through said sludge for entraining the residue of the solvent in a direction opposite the flow direction of the squeezed-out solvent, and thereupon driving the entrained residue into the collector by way of another filter mass.

2. A process as defined in claim 1, comprising the further step of heating the compacted sludge and the first-mentioned mass prior to admitting steam into said outlet.

3. An apparatus for the recovery of solvent from sludge produced by dry-cleaning equipment, comprising a chamber, first filter means in said chamber forming a substantially horizontal receiving surface, said first filter means dividing the interior of said chamber into an upper and a lower compartment, upstanding second filter means positioned in said upper compartment above said receiving surface, said chamber having an inlet at said upper compartment for depositing said sludge on said receiving surface around said second filter means, a source of pressure fluid selectively connectable with said upper compartment for compacting said sludge against both said filter means, said second filter means being provided with an outlet bypassing said first filter means and leading to said lower compartment for passing a flow of solvent pressed out of said sludge by said fluid, closure means in said outlet, discharge means in said lower compartment for pressed-out solvent received therein via said first filter means and said outlet in the open state of said closure means, and a supply connection to said outlet at a location between said closure means and said second filter means for selectively admitting steam into said sludge by way of said second filter means, in the closed state of said closure means, in a direction opposite the flow direction of the pressed-out solvent, whereby solvent from said sludge is flushed into said lower compartment by way of said first filter means, said chamber having access means at least at said upper compartment for removal of the flushed sludge therefrom.

4. An apparatus according to claim 3 wherein said chamber is provided with a heating jacket surrounding said compartments.

5. An apparatus according to claim 3 wherein said second filter means comprises a structure with substantially vertical spaced-apart perforated walls traversable by said solvent and said steam.

6. An apparatus according to claim 5 wherein said walls are concentrically cylindrical.

References Cited in the file of this patent

UNITED STATES PATENTS

| | | |
|---|---|---|
| 1,693,207 | Naylor | Nov. 27, 1928 |
| 2,378,737 | Simkovits | June 19, 1945 |
| 2,379,848 | Damme et al. | July 3, 1945 |
| 2,593,227 | Wagner | Apr. 15, 1952 |

FOREIGN PATENTS

| | | |
|---|---|---|
| 449,106 | Canada | June 15, 1948 |